March 21, 1933.  G. A. TAYLOR  1,901,997
ENGINE STARTING DEVICE
Filed Sept. 26, 1931  2 Sheets-Sheet 2
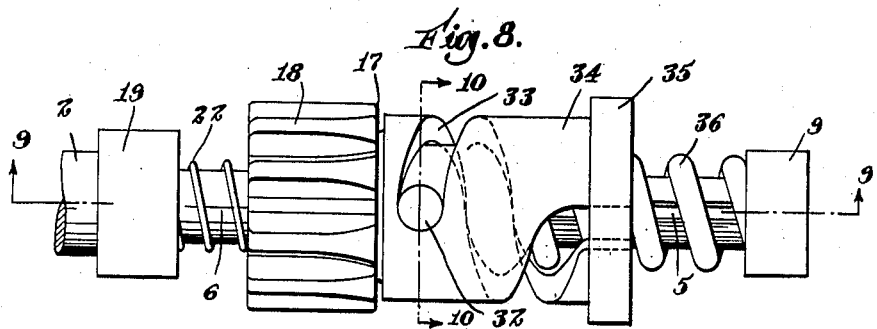
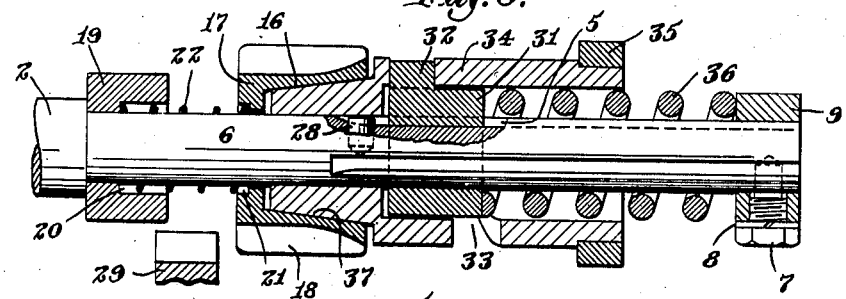
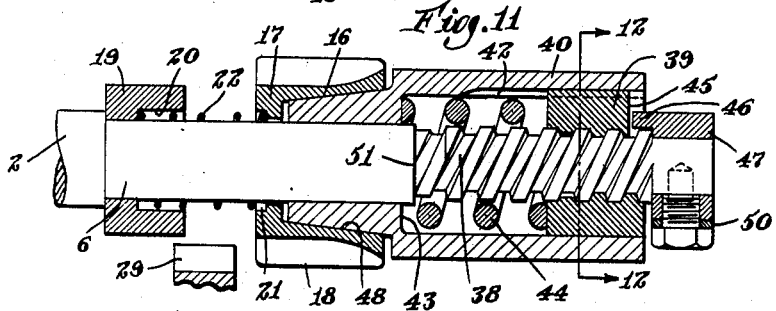
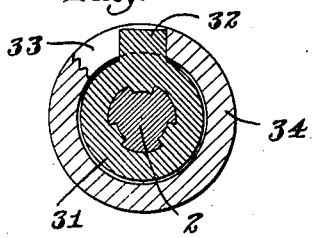
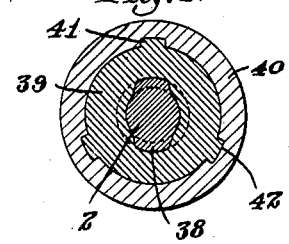
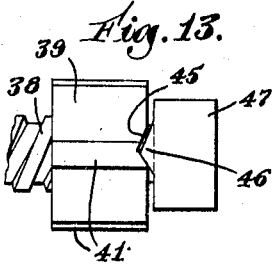
Inventor
George A. Taylor,
by Harold J. Clark.
Attorney Patented Mar. 21, 1933

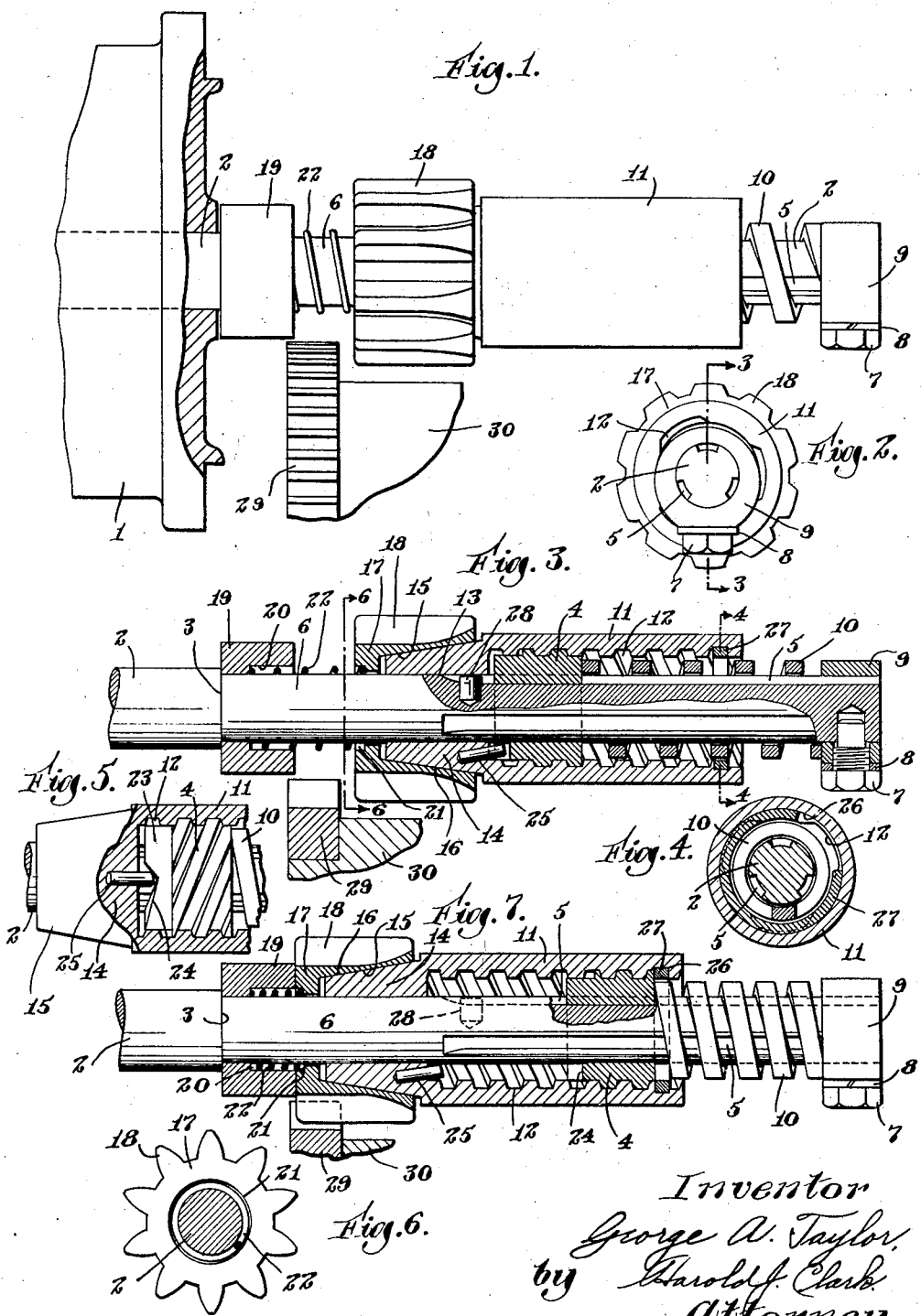

1,901,997

UNITED STATES PATENT OFFICE

GEORGE A. TAYLOR, OF HYDE PARK, MASSACHUSETTS

ENGINE STARTING DEVICE

Application filed September 26, 1931. Serial No. 565,237.

My present invention relates to starting devices, and more particularly to a novel and improved starter for internal combustion engines.

An important object of the present invention is the provision of a starting device which is simple in the extreme to manufacture and assemble, economical, and positive and efficient in its operation.

Another important object of the present invention resides in the provision of a starting device in which the operating member or pinion is moved into engagement or mesh with the teeth of the cooperating engine part, namely, the fly wheel, without any substantial torque being imposed thereon.

Another important object of the present invention resides in the provision of means, operative after interengagement of the operating pinion and fly wheel gear, to develop a predetermined driving torque.

Another feature of the present invention resides in the provision of a friction clutch element interposed between the armature shaft and the pinion, so constructed and arranged that the friction of said clutch element is increased to but not beyond the predetermined degree.

The starting device of the present application is in that class of starting devices known as inertia starters, and is applicable to either the inboard or outboard type of starters.

By reason of the presence of the friction clutch element between the armature shaft and the driving pinion, likelihood of injury or damage to either the pinion or the fly wheel ring gear is eliminated, as the predetermined torque which is developed by my device is sufficient to rotate the fly wheel under any conditions of engine compression, but is insufficient to withstand a backfire or other abnormal condition.

In the drawings of the present application I have illustrated the use of a cone clutch, but it will be understood and appreciated that I not not limit myself to this particular type of clutch, it being within the range of my present invention to utilize either the cone clutch illustrated, a single disc friction clutch, or a multiple disc friction clutch.

Other features and objects of the present invention reside in the particular construction and arrangement of the parts of my novel starting device, and all of the above, together with other objects and features of the invention, details of construction, combinations of parts, and advantages, will be hereinafter more fully pointed out, described, and claimed.

Referring to the drawings, illustrating preferred embodiments of the present invention, Fig. 1 is a side elevation illustrating my invention embodied in an inboard starting device;

Fig. 2 is an end elevation of said starter;

Fig. 3 is a longitudinal sectional view on the line 3—3 of Fig. 2;

Fig. 4 is a vertical sectional view on the line 4—4 of Fig. 3;

Fig. 5 is a fragmentary sectional elevation illustrating the means to prevent jamming of the control screw in the threads of the sliding sleeve;

Fig. 6 is a vertical sectional view on the line 6—6 of Fig. 3;

Fig. 7 is a longitudinal sectional view illustrating the starter of Fig. 3 in engine starting position;

Fig. 8 is a side elevation of a modified starter;

Fig. 9 is a longitudinal sectional view on the line 9—9 of Fig. 8;

Fig. 10 is a cross sectional view of the line 10—10 of Fig. 8;

Fig. 11 is a longitudinal sectional view of a further modified starter;

Fig. 12 is a vertical sectional view on the line 12—12 of Fig. 11; and

Fig. 13 is a fragmentary top plan view illustrating the means to limit the movement of the controlling screw in one direction.

Referring now to the drawings, for a particular description of the invention, its construction and operation, and particularly to Figs. 1 to 7 inclusive, illustrating the preferred form of the invention, 1 designates a conventional starter motor provided with an armature shaft 2 projecting outwardly beyond one end of the motor 1.

The armature shaft 2 is reduced in diameter from the point 3 to its outermost end, and splined to said reduced portion is a control screw 4, the keyways 6 on the shaft extending but partially therealong, leaving a smooth portion designated at 6. Fixed to the outer end of the shaft 2 by a cap screw 7 and lock washer 8 is a cam-shaped collar 9, and interposed between the inner face of said collar 9 and the screw 4 is a coiled spring 10. A sleeve 11 is internally threaded, as illustrated at 12, and is in mesh with the screw 4, the sleeve 11 having a smooth bore at 13 in engagement with the smooth portion 6 of the armature shaft 2.

The inner end 14 of the sleeve 11 is tapered, as at 15, this tapered face comprising one portion of a cone clutch, the other portion of said clutch being the conical inner face 16 of a driving pinion 17 which is provided with teeth 18. From an inspection of Figs. 3 and 7 it will be apparent that the pinion 17 rides on and is supported by the forward end 14 of the sleeve 11, said pinion being disengaged from the smooth portion 6 of the armature shaft 2.

Fixed on the reduced portion of the armature shaft 2 and butting against the shoulder 3, is a collar 19 provided with a recess 20. The forward end of the pinion 17 is also provided with a recess 21, and surrounding the smooth portion 6 and having its ends housed in the recesses 20 and 21 is a relatively light coiled spring 22, the normal tendency of this spring 22 being to force the pinion 17 in a direction away from the collar 19. The forward end of the control screw 4 is smooth, as illustrated at 23, and is provided with a tapered recess 24, adapted to be engaged, when the screw is in the position illustrated in Fig. 3, by a pin 25 projecting into the hollow interior of the sleeve 11. Positioned in an annular groove 26 adjacent to the rear end of the sleeve 11 is a split ring 27 which is flush with the internal diameter of the sleeve 11 and intersects the threads 12. A pin 28 is fitted in the reduced portion of the armature shaft 2 and projects into one of the keyways 5 adjacent to the inner end of said keyway, this pin 28 being so positioned as to limit the movement of the control screw 4 along the keyways 5, to thus prevent jamming of said screw in said keyways.

This pin 28 will prevent axial rebound of the screw 4, sleeve 11 and pinion 17, should such rebound be imparted thereto on any occasion. It will be noted from a glance at Fig. 3, with the parts in normal position, that the distance between the pin 28 and adjacent face of the screw 4 is less than the distance between the adjacent faces of the pinion 17 and ring gear 29. Thus, should rebound be imparted to the screw, sleeve and pinion, it will be checked by the pin 28 before contact between the adjacent faces of said pinion and said ring gear, this effectively obviating the likelihood of any possible injury or damage thereto.

The pinion 17 is positioned in register with the ring gear 29 on the engine fly wheel 30, the teeth of said ring gear being engaged by the teeth 18 of the pinion 17 on operation of the starting device.

The operation of the starting device illustrated in Figs. 1 to 7 inclusive is simple, and will be readily understood by those skilled in this art, being briefly described as follows:

The motor 1 being energized, will effect a rotation of the armature shaft 2, and hence of the screw 4 splined thereon. The rotation of the screw 4, and the threaded union between said screw and the sleeve 11, will effect a spiral longitudinal movement of the sleeve 11 along the shaft 2, to the left, as viewed in Fig. 3, the said sleeve carrying with it the pinion 17. As the teeth 18 of the pinion 17 come in mesh with the teeth of the fly wheel ring gear 29, the pinion will butt against the collar 19, thus effectually preventing further longitudinal movement of the pinion 17 and sleeve 11 in that direction.

Thereupon, rotation of the armature shaft 2 being continued, the screw 4 will be threaded in the threads 12 of the sleeve 11, forcing said screw to the right, as viewed in Fig. 3, against the tension of the coiled spring 10. As the spring 10 is compressed, between the screw 4 and collar 9, friction between the clutch faces 15 and 16 will be increased, until the screw 4 engages the stop ring 27, at which time a predetermined driving torque will have been developed between the sleeve 11 and pinion 17. This torque will be sufficient to rotate the fly wheel 30 under any normal conditions of compression, or the like, but, upon starting of the engine, which will greatly increase the speed of rotation of the fly wheel 30, the pinion 17 will rotate, through the clutch, the sleeve 11 and hence the screw 4 in the opposite direction, disengaging the pinion 17 from the fly wheel ring gear 29, this disengagement being assisted by the coiled spring 22.

When the starting device is in normal operating position, with the predetermined torque developed, the parts will be in the position illustrated in Fig. 7. On movement of the screw 4 to the normal position illustrated in Fig. 3, any tendency on the part of the screw 4 to jam in the keyways 5 will be obviated by the pin 28, and any tendency on the part of the screw 4 to wedge in the threads 12 of the sleeve 11 will be obviated by the engagement of the pin 25 in the wedge-shaped recess 24. The presence of the wedge-shaped recess 24 also tends to prevent rotative rebound of the sleeve 11.

It will thus be apparent that the screw 4 performs a plurality of functions. It first feeds the sleeve 11 and pinion 17 to the left, or toward the ring gear 29, with no torque other than that created by the friction of the teeth of the screw 4 in the threads 12. When the movement of the pinion toward the fly wheel has stopped, the screw then creates a gradually increasing torque on the cone clutch between the sleeve and pinion, increasing said torque until a predetermined point has been reached, said point of course being determined by the engagement of the screw 4 with the split ring 27.

From an inspection of the drawings it will be apparent that when the screw 4 has engaged the split ring 27, the spring 10 is not fully compressed. This fact is also true in the case of end butting between the forward face of the pinion and the face of the teeth on the ring gear 29. Thus, even in the case of end butting, the pinion is urged against the ring gear resiliently, and not under a direct metal-to-metal push. Thus, likelihood of injury to either the pinion 17 or ring gear 29 is obviated, as will be readily understood.

I believe that the starting device illustrated and above briefly described is novel, and I have therefore claimed the same broadly in the present application.

Referring now to Figs. 8, 9 and 10, there is here illustrated a modification, wherein the screw 31 is provided with a follower 32 riding in the cam slot 33 in the sleeve 34. The armature shaft 2 is unchanged, the pin 28 being located in one of the keyways 5 by means of which the screw 31 is splined to the reduced portion of the armature shaft 2. A collar 35 surrounds the open end of the sleeve 34, and serves the dual function of reenforcing the sleeve at the open end of the cam slot 33, and also affording a stop for the follower 32.

This modification of my starter is provided with the collar 19 having the recess 20, and the pinion 17 having the recess 21, the coiled spring 22 surrounding the smooth portion 6 of the reduced portion of the armature shaft, and being housed in the recesses 20 and 21. The pinion 17 is provided with teeth 18 adapted to mesh with the ring gear 29. A coiled spring 36 surrounds the keyed portion of the armature shaft and is confined between the screw 31 and the collar 9 which is secured to the shaft by cap screw 7 and lock washer 8. The forward end of the sleeve 34 is provided with the tapered clutch face 37 cooperating with the tapered inner face 16 of the pinion 17. The operation of this form of my device is identical with that of the form illustrated in Figs. 1 to 7 inclusive. On rotation of the armature shaft 2, the screw 31 will likewise be rotated, and the follower 32, riding in the slot 33 will force the sleeve 34 and pinion 17 to the left, as viewed in Fig. 9, until engagement between the pinion 17 and ring gear 29 has been accomplished. Thereupon continuance of rotation of the screw 31 will effect a longitudinal sliding of said screw along the shaft 2, compressing the spring 36 until the follower 32 engages the collar 35, at which point the spring 36 will be compressed to a predetermined degree to develop a predetermined torque upon the pinion 17.

In Figs. 11, 12 and 13 I have illustrated a still further modification, wherein the reduced end of the armature shaft 2, instead of being provided with the keyways 5, is threaded, as at 38. Threaded to this portion of the shaft is a nut 39 splined to the sleeve 40 by means of the keys 41 and keyways 42. Confined between the nut 39 and the inner shoulder 43 of the sleeve 40 is a coiled spring 44.

The nut 39 is provided with a wedge-shaped recess 45 adapted to be engaged by the wedge-shaped projection 46 on the retaining collar 47 when the nut 39 is in normal position, to prevent wedging of the nut in the threads of the shaft. The forward end of the sleeve 40 is provided with a tapered clutch surface 48, seated within the tapered surface 16 of the pinion 17. The stop collar 47 is fixed to the outer end of the shaft 2 by bolt 49 and lock washer 50.

The operation of this form of my invention is also simple, and will be readily understood. On rotation of the armature shaft 2, the nut 39 will be threaded along the portion 38 of said shaft, bearing against the spring 44, and, since said spring in turn bears against the shoulder 43 of the sleeve 40, said sleeve 40 will be moved to the left, viewing Fig. 11, carrying with it the pinion 17, until the teeth 18 thereof are fully in mesh with the teeth of the ring gear 29. When movement of the pinion 17 to the left has been stopped, the travel of the nut 39 along the threaded portion 38 of the shaft 2 will still continue, compressing the spring 44 until the left-hand side of the nut 39, viewing Fig. 11, engages the shoulder 51 of the shaft 2. At this point the predetermined torque which has been above described will have been developed, sufficient for all normal starting conditions. Disengagement of the starter drives illustrated in Figs. 8 and 11 will be identical with that described for the form illustrated in Figs. 1 to 7 inclusive.

It will be readily apparent that the modifications illustrated in Figs. 8 to 13 inclusive are within the range of my present invention, and claims to the same are therefore included in this application.

While I have necessarily described my present invention somewhat in detail, it will be appreciated that I may vary the size, shape, and arrangement of parts, within reasonably wide limits, without departing from the spirit of the invention.

My invention is further described and defined in the form of claims as follows:

1. An engine starting device comprising an armature shaft, a sleeve mounted for rotary and longitudinal movement relative to said shaft, a pinion carried by said sleeve and adapted to be moved into and out of mesh with an engine gear, stop means to limit engine gear engaging movement of said pinion, a friction clutch interposed between the said sleeve and the said pinion, and means cooperating with said stop means to progressively develop a predetermined torque on said pinion.

2. An engine starting device comprising an armature shaft, a sleeve mounted for rotary and longitudinal movement relative to said shaft, a pinion carried by said sleeve and adapted to be moved into and out of mesh with an engine gear, stop means to limit engine gear engaging movement of said pinion, a cone clutch interposed between the said sleeve and the said pinion, and means cooperating with said stop means to progressively develop a predetermined torque on said pinion.

3. An engine starting device comprising an armature shaft, a sleeve mounted for rotary and longitudinal movement relative to said shaft, a pinion carried by said sleeve and adapted to be moved into and out of mesh with an engine gear, stop means to limit engine gear engaging movement of said pinion, a friction clutch interposed between the said sleeve and the said pinion, and means including a resilient element cooperating with said stop means to progressively develop a predetermined torque on said pinion.

4. An engine starting device comprising an armature shaft, a sleeve mounted for rotary and longitudinal movement relative to said shaft, a pinion carried by said sleeve and adapted to be moved into and out of mesh with an engine gear, stop means to limit engine gear engaging movement of said pinion, a cone clutch interposed between the said sleeve and the said pinion, and means including a resilient element cooperating with said stop means to progressively develop a predetermined torque on said pinion.

5. An engine starting device comprising an armature shaft, a sleeve mounted for rotary and longitudinal movement relative to said shaft and having a male clutch surface at one end thereof, a pinion mounted for rotary and longitudinal movement relative to said shaft and adapted to be moved into and out of mesh with an engine gear, said pinion having a female clutch surface for engagement by said male clutch surface, and means to progressively develop a predetermined torque on said pinion through the medium of said clutch surfaces.

6. An engine starting device comprising an armature shaft, a sleeve mounted for rotary and longitudinal movement relative to said shaft and having a male clutch surface at one end thereof, a pinion mounted for rotary and longitudinal movement relative to said shaft and adapted to be moved into and out of mesh with an engine gear, said pinion having a female clutch surface for engagement by said male clutch surface, and means including a resilient element to progressively develop a predetermined torque on said pinion through the medium of said clutch surfaces.

7. An engine starting device comprising an armature shaft, a sleeve mounted for rotary and longitudinal movement relative to said shaft, a pinion mounted for rotary and longitudinal movement relative to said shaft and adapted to be moved into and out of mesh with an engine gear, a friction clutch interposed between the said sleeve and the said pinion, a screw housed within said sleeve and operatively connected to said sleeve and to said shaft, rotation of said shaft effecting rotation of said screw and hence a movement of said sleeve and said pinion longitudinaly of said shaft until said pinion is in mesh with said engine gear, a coiled spring surrounding said shaft and engaged by said screw, continued rotation of said screw after meshing of said pinion with said engine gear effecting a compression of said spring and a progressive development of torque on said pinion through said friction clutch, and means to stop movement of said screw when said torque has reached a predetermined point.

8. An engine starting device comprising an armature shaft, a sleeve mounted for rotary and longitudinal movement relative to said shaft, a pinion mounted for rotary and longitudinal movement relative to said shaft and adapted to be moved into and out of mesh with an engine gear, a friction clutch interposed between the said sleeve and the said pinion, a screw housed within said sleeve and operatively connected to said sleeve and to said shaft, rotation of said shaft effecting rotation of said screw and hence a movement of said sleeve and said pinion longitudinally of said shaft until said pinion is in mesh with said engine gear, a coiled spring surrounding said shaft and engaged by said screw, continued rotation of said screw after meshing of said pinion with said engine gear effecting a compression of said spring and a progressive development of torque on said pinion through said friction clutch, and means on said sleeve to stop movement of said screw when said torque has reached a predetermined point.

9. An engine starting device comprising an armature shaft, a sleeve mounted for rotary and longitudinal movement relative to said shaft, a pinion mounted for rotary and longitudinal movement relative to said shaft and adapted to be moved into and out of mesh with an engine gear, a friction clutch interposed between the said sleeve and the said pinion, a screw splined to said shaft and threaded to said sleeve, rotation of said shaft effecting rotation of said screw and hence a movement of said sleeve and said pinion longitudinally of said shaft until said pinion is in mesh with said engine gear, a coiled spring surrounding said shaft and engaged by said screw, continued rotation of said shaft after meshing of said pinion with said engine gear effecting movement of said screw longitudinally of said shaft away from said pinion and effecting a compression of said spring and a progressive development of torque on said pinion through said friction clutch, and means to stop movement of said screw when said torque has reached a predetermined point.

10. An engine starting device comprising an armature shaft, a sleeve mounted for rotary and longitudinal movement relative to said shaft, a pinion carried by said sleeve for rotary and longitudinal movement relative to said shaft and adapted to be moved into and out of mesh with an engine gear, a friction clutch interposed between the said sleeve and the said pinion, a screw splined to said shaft and threaded to said sleeve, rotation of said shaft effecting rotation of said screw and hence a movement of said sleeve and said pinion longitudinally of said shaft until said pinion is in mesh with said engine gear, a coiled spring surrounding said shaft and engaged by said screw, continued rotation of said shaft after meshing of said pinion with said engine gear effecting movement of said screw longitudinally of said shaft away from said pinion and effecting a compression of said spring and a progressive development of torque on said pinion through said friction clutch, and means to stop movement of said screw when said torque has reached a predetermined point.

11. An engine starting device comprising an armature shaft, a sleeve mounted for rotary and longitudinal movement relative to said shaft, a pinion carried by said sleeve and spaced from said shaft for rotary and longitudinal movement relative to said shaft and adapted to be moved into and out of mesh with an engine gear, a friction clutch interposed between the said sleeve and the said pinion, a screw splined to said shaft and threaded to said sleeve, rotation of said shaft effecting rotation of said screw and hence a movement of said sleeve and said pinion longitudinally of said shaft until said pinion is in mesh with said engine gear, a coiled spring surrounding said shaft and engaged by said screw, continued rotation of said shaft after meshing of said pinion with said engine gear effecting movement of said screw longitudinally of said shaft, away from said pinion and effecting a compression of said spring and a progressive development of torque on said pinion through said friction clutch, and means to stop movement of said screw when said torque has reached a predetermined point.

12. An engine starting device comprising an armature shaft, a sleeve mounted for rotary and longitudinal movement relative to said shaft, a pinion mounted for rotary and longitudinal movement relative to said shaft and adapted to be moved into and out of mesh with an engine gear, a friction clutch interposed between the said sleeve and the said pinion, a screw splined to said shaft and threaded to said sleeve, rotation of said shaft effecting rotation of said screw and hence a movement of said sleeve and said pinion longitudinally of said shaft until said pinion is in mesh with said engine gear, means to prevent wedging of said screw in the keyways of said shaft, a coiled spring surrounding said shaft and engaged by said screw, continued rotation of said shaft after meshing of said pinion with said engine gear effecting movement of said screw longitudinally of said shaft away from said pinion and effecting a compression of said spring and a progressive development of torque on said pinion through said friction clutch, and means to stop movement of said screw when said torque has reached a predetermined point.

13. An engine starting device comprising an armature shaft, a sleeve mounted for rotary and longitudinal movement relative to said shaft, a pinion mounted for rotary and longitudinal movement relative to said shaft and adapted to be moved into and out of mesh with an engine gear, a friction clutch interposed between the said sleeve and the said pinion, a screw splined to said shaft and threaded to said sleeve, rotation of said shaft effecting rotation of said screw and hence a movement of said sleeve and said pinion longitudinally of said shaft until said pinion is in mesh with said engine gear, means to prevent wedging of said screw in the threads of said sleeve, a coiled spring surrounding said shaft and engaged by said screw, continued rotation of said shaft after meshing of said pinion with said engine gear effecting movement of said screw longitudinally of said shaft away from said pinion and effecting a compression of said spring and a progressive development of torque on said pinion through said friction clutch, and means to stop movement of said screw when said torque has reached a predetermined point.

14. An engine starting device comprising an armature shaft, a sleeve mounted for rotary and longitudinal movement relative to said shaft, a pinion mounted for rotary and longitudinal movement relative to said shaft and adapted to be moved into and out of mesh with an engine gear, a friction clutch interposed between the said sleeve and the said pinion, a screw splined to said shaft and threaded to said sleeve, rotation of said shaft effecting rotation of said screw and hence a movement of said sleeve and said pinion longitudinally of said shaft until said pinion is in mesh with said engine gear, means to prevent wedging of said screw in the keyways of said shaft, means to prevent wedging of said screw in the threads of said sleeve, a coiled spring surrounding said shaft and engaged by said screw, continued rotation of said shaft after meshing of said pinion with said engine gear effecting movement of said screw longitudinally of said shaft away from said pinion and effecting a compression of said spring and a progressive development of torque on said pinion through said friction clutch, and means to stop movement of said screw when said torque has reached a predetermined point.

15. An engine starting device comprising an armature shaft, a sleeve mounted for rotary and longitudinal movement relative to said shaft, a pinion mounted for rotary and longitudinal movement relative to said shaft and adapted to be moved into and out of mesh with an engine gear, a friction clutch interposed between the said sleeve and the said pinion, a screw splined to said shaft and threaded to said sleeve, rotation of said shaft effecting rotation of said screw and hence a movement of said sleeve and said pinion longitudinally of said shaft until said pinion is in mesh with said engine gear, angularly disposed cooperating means on said sleeve and said screw to prevent wedging of said screw in the threads of said sleeve, a coiled spring surrounding said shaft and engaged by said screw, continued rotation of said shaft after meshing of said pinion with said engine gear effecting movement of said screw longitudinally of said shaft away from said pinion and effecting a compression of said spring and a progressive development of torque on said pinion through said friction clutch, and means to stop movement of said screw when said torque has reached a predetermined point.

16. An engine starting device comprising an armature shaft, a sleeve mounted for rotary and longitudinal movement relative to said shaft, a pinion mounted for rotary and longitudinal movement relative to said shaft and adapted to be moved into and out of mesh with an engine gear, a friction clutch interposed between the said sleeve and the said pinion, a screw splined to said shaft and threaded to said sleeve, rotation of said shaft effecting rotation of said screw and hence a movement of said sleeve and said pinion longitudinally of said shaft until said pinion is in mesh with said engine gear, angularly disposed cooperating means on said sleeve and said screw to prevent wedging of said screw in the threads of said sleeve and prevent rotative rebound of said sleeve, a coiled spring surrounding said shaft and engaged by said screw, continued rotation of said shaft after meshing of said pinion with said engine gear effecting movement of said screw longitudinally of said shaft away from said pinion and effecting a compression of said spring and a progressive development of torque on said pinion through said friction clutch, and means to stop movement of said screw when said torque has reached a predetermined point.

17. An engine starting device comprising an armature shaft, a sleeve mounted for rotary and longitudinal movement relative to said shaft, a pinion mounted for rotary and longitudinal movement relative to said shaft and adapted to be moved into and out of mesh with an engine gear, a friction clutch interposed between the said sleeve and the said pinion, a screw splined to said shaft and threaded to said sleeve, rotation of said shaft effecting rotation of said screw and hence a movement of said sleeve and said pinion longitudinally of said shaft until said pinion is in mesh with said engine gear, means to prevent wedging of said screw in the threads of said sleeve and to check axial rebound of said pinion, sleeve and screw, a coiled spring surrounding said shaft and engaged by said screw, continued rotation of said shaft after meshing of said pinion with said engine gear effecting movement of said screw longitudinally of said shaft away from said pinion and effecting a compression of said spring and a progressive development of torque on said pinion through said friction clutch, and means to stop movement of said screw when said torque has reached a predetermined point.

18. An engine starting device comprising an armature shaft, a sleeve mounted for rotary and longitudinal movement relative to said shaft, a pinion mounted for rotary and longitudinal movement relative to said shaft and adapted to be moved into and out of mesh with an engine gear, a friction clutch interposed between the said sleeve and the said pinion, a member operatively connected to said sleeve and to said shaft, rotation of said shaft effecting rotation of said member and hence a movement of said sleeve and said pinion longitudinally of said shaft until said pinion is in mesh with said engine gear, a coiled spring surrounding said shaft and engaged by said member, continued rotation of said member after meshing of said pinion with said engine gear effecting a compression of said spring and a progressive development of torque on said pinion through said friction clutch, and means to stop movement of said member when said torque has reached a predetermined point.

19. An engine starting device comprising an armature shaft, a sleeve mounted for rotary and longitudinal movement relative to said shaft, a pinion mounted for rotary and longitudinal movement relative to said shaft and adapted to be moved into and out of mesh with an engine gear, a friction clutch interposed between the said sleeve and the said pinion, a member operatively connected to said shaft, a pin on said member, said sleeve having a cam slot therein, said pin riding in said slot, rotation of said shaft effecting rotation of said member and hence a movement of said sleeve and said pinion longitudinally of said shaft until said pinion is in mesh with said engine gear, a coiled spring surrounding said shaft and engaged by said member, continued rotation of said member after meshing of said pinion with said engine gear effecting a compression of said spring and a progressive development of torque on said pinion through said friction clutch, and means to stop movement of said member when said torque has reached a predetermined point.

20. An engine starting device comprising a rotary power shaft, a power transmission element mounted for longitudinal movement relative to the power shaft, an engine driving element mounted to be moved into engagement with an engine part to be started by longitudinal movement of said power transmission element, a friction clutch between said elements whereby rotation of the power transmission element effects rotation of the engine driving element, stop means to limit engine part engaging movement of said engine driving element, and means operable by rotation of the power shaft to yieldably urge said power transmission element longitudinally in a direction to effect engagement of the engine driving element with the engine part and also to effect rotation of said power transmission element.

21. An engine starting device comprising a rotary power shaft, a power transmission element mounted for longitudinal movement relative to the power shaft and for rotation therewith, an engine driving element frictionally clutched to said power transmission element for longitudinal movement therewith into engagement with an engine part to be started and also for rotation therewith, stop means to limit engine part engaging movement of said engine driving element, a member splined to said power shaft for rotation therewith and for longitudinal movement relative thereto, a connection between said member and said power transmission element operable by rotation of the shaft to move the power transmission element longitudinally in a direction to move the engine driving member into engagement with the engine part to be started, and yieldable means from which said member reacts to produce longitudinal movement of the power transmission element.

22. An engine starting device comprising a power transmission element mounted for rotation and for longitudinal movement, an engine driving element frictionally clutched to said power transmission element for rotation therewith and also for longitudinal movement therewith into engagement with an engine part to be started, stop means to limit engine part engaging movement of said engine driving element, a rotatable and longitudinally movable power delivery member, a connection between said power delivery member and said power transmission element operable by rotation of the power delivery member to move the power transmission element longitudinally, and yieldable means from which said power delivery member reacts to produce longitudinal movement of the power transmission element.

23. An engine starting device comprising a rotary power shaft, a power transmission element mounted for rotation and for longitudinal movement, an engine driving element frictionally clutched to said power transmission for rotation therewith and also for longitudinal movement therewith into engagement with an engine part to be started, stop means to limit engine part engaging movement of said engine driving element, a power delivery member between the shaft and the power transmission element, a connection between said power transmission element and said power delivery member permitting longitudinal movement of the latter relative to the former and preventing their relative rotation, a connection between the power delivery member and the shaft operable by rotation of the shaft to move the power delivery member longitudinally and to rotate said member, and yieldable means through which the power delivery member operates when moved longitudinally to move the power transmission element to effect engagement of the engine driving element with the engine part to be started and the aforesaid stop means.

24. An engine starting device comprising a rotary power shaft, a power transmission element mounted for longitudinal movement relative to said power shaft and for rotation therewith, an engine driving element clutched to said power transmission element for longitudinal movement therewith into engagement with an engine part to be started, stop means to limit engine part engaging movement of said engine driving element, a power delivery member between the shaft and the power transmission element having a threaded connection with the latter element and a splined connection with the shaft, an abutment on the shaft, and a spring between said abutment and said power delivery member from which said power delivery member reacts to move the power transmission element longitudinally to effect engagement of the engine driving element with the engine part and said stop means when the power shaft is rotated.

In testimony whereof, I have signed my name to this specification.

GEORGE A. TAYLOR.